(12) United States Patent
Mittal et al.

(10) Patent No.: US 12,250,139 B2
(45) Date of Patent: Mar. 11, 2025

(54) SEGMENT ROUTING SRV6 S-BFD AND PING REPLIES HAVING DETERMINISTIC REPLY PATH

(71) Applicant: Ciena Corporation, Hanover, MD (US)

(72) Inventors: Aditya Mittal, Gurgaon (IN); Pankaj Verma, Kanpur (IN); Sudipta Das, New Delhi (IN)

(73) Assignee: Ciena Corporation, Hanover, MD (US)

( * ) Notice: Subject to any disclaimer, the term of this patent is extended or adjusted under 35 U.S.C. 154(b) by 89 days.

(21) Appl. No.: 18/310,131

(22) Filed: May 1, 2023

(65) Prior Publication Data

US 2024/0314059 A1 Sep. 19, 2024

(30) Foreign Application Priority Data

Mar. 17, 2023 (IN) .............................. 202311018237

(51) Int. Cl.
*G06F 15/173* (2006.01)
*H04L 45/00* (2022.01)
*H04L 45/02* (2022.01)

(52) U.S. Cl.
CPC .............. *H04L 45/02* (2013.01); *H04L 45/34* (2013.01)

(58) Field of Classification Search
CPC ................................. H04L 45/02; H04L 45/34
See application file for complete search history.

(56) References Cited

U.S. PATENT DOCUMENTS

| | | |
|---|---|---|
| 8,356,128 B2 | 1/2013 | Mittal |
| 8,370,552 B2 | 2/2013 | Mittal et al. |
| 9,628,366 B2 | 4/2017 | Majumdar et al. |
| 10,577,994 B2 | 3/2020 | Mittal et al. |
| 2015/0242296 A1 | 8/2015 | Mittal et al. |
| 2016/0149765 A1 | 5/2016 | Mittal et al. |
| 2018/0212828 A1 | 7/2018 | Sekhri et al. |
| 2020/0127909 A1 | 4/2020 | Mittal et al. |
| 2021/0250284 A1 | 8/2021 | Aggarwal et al. |

(Continued)

FOREIGN PATENT DOCUMENTS

WO 2023/287651 A1 1/2023

OTHER PUBLICATIONS

M. Chen et al., "Segment Routing for Unaffiliated BFD Echo Function," Internet-Draft, Standards Track, Aug. 2, 2021, 9 Pages.

(Continued)

*Primary Examiner* — Joseph R Maniwang
(74) *Attorney, Agent, or Firm* — Baratta Law PLLC; Lawrence A. Baratta, Jr.

(57) ABSTRACT

A node is configured to operate in a Segment Routing (SR) over Internet Protocol version 6 (SRv6) network, and the node includes circuitry configured to determine a Segment Identifier (SID) list for a forward path in the SRv6 network and SID list for a reverse path in the SRv6 network; and transmit a monitoring packet on the forward path including a Segment Routing Header (SRH) with the SID list for the forward path, and further including the SID list for the reverse path in the monitoring packet, for a SRH of a reply to the monitoring packet. The circuitry can be further configured to receive the reply to the monitoring packet, with the reply having been on a same or different tunnel as the monitoring packet, for monitoring liveliness thereof.

20 Claims, 19 Drawing Sheets

(56) References Cited

U.S. PATENT DOCUMENTS

2022/0263752 A1 8/2022 Sharma et al.
2023/0021278 A1* 1/2023 Filsfils .................. H04L 45/566

OTHER PUBLICATIONS

C. Lin et al., "S-BFD Path Consistency over SRv6," BFD Working Group, Internet Draft, Informational, Jan. 12, 2023, 12 Pages.

Jul. 3, 2024, European Search Report for European Patent Application No. EP 24 16 1481.

* cited by examiner

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |     Type      |     Code      |          Checksum             |
   +-+-+-+-+-+-+-+-+-+-+-+-+-+-+-+-+-+-+-+-+-+-+-+-+-+-+-+-+-+-+-+-+
   |           Identifier          |        Sequence Number        |
   +-+-+-+-+-+-+-+-+-+-+-+-+-+-+-+-+-+-+-+-+-+-+-+-+-+-+-+-+-+-+-+-+
   |     Data ...
   +-+-+-+-+-
```

ICMPv6 Fields:

Type              Request = 128, Reply = 129
Code              0
Identifier        The identifier from the invoking Echo Request message.
Sequence Number   The sequence number from the invoking Echo Request message.
Data              The data from the invoking Echo Request message.

FIG. 10

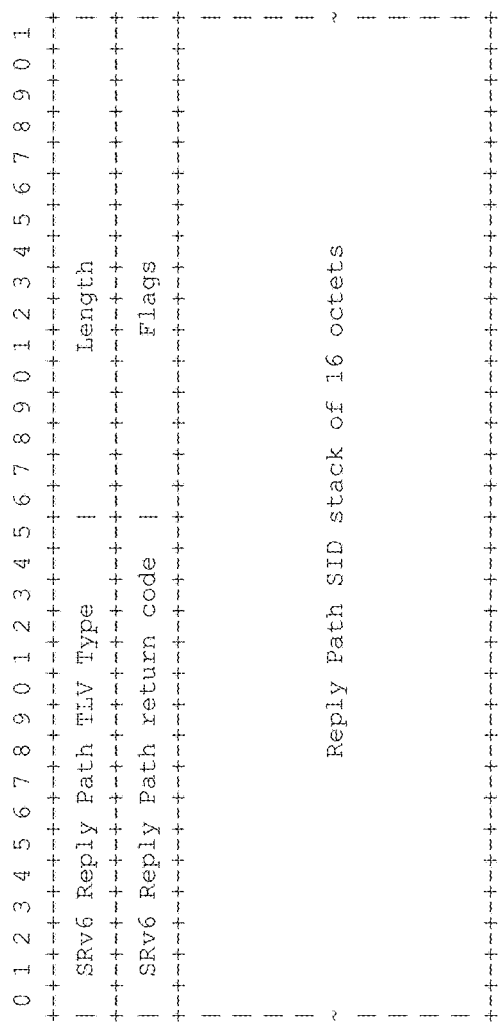

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| SRv6 Reply Path TlV Type     |           Length               |
+-+-+-+-+-+-+-+-+-+-+-+-+-+-+-+-+-+-+-+-+-+-+-+-+-+-+-+-+-+-+-+-+
| SRv6 Reply Path return code  |           Flags                |
+-+-+-+-+-+-+-+-+-+-+-+-+-+-+-+-+-+-+-+-+-+-+-+-+-+-+-+-+-+-+-+-+
|                                                               |
~               Reply Path SID stack of 16 octets               ~
|                                                               |
+-+-+-+-+-+-+-+-+-+-+-+-+-+-+-+-+-+-+-+-+-+-+-+-+-+-+-+-+-+-+-+-+
```

SRv6 Reply Path TLV Type : A new type of 2-byte decimal value assigned by IANA.

Length: 2-byte length of data available TLV.

SRv6 Reply Path return code: Errors detected by control plane with respect to reply path availability. This is of 2 bytes Value:
0x0000 Reserved.
0x0001 Malformed Reply Path TLV was received.
0x0002 One or more of the sub-TLVs in the Reply Path TLV were not understood.
0x0003 The echo reply was sent successfully using the specified Reply Path.
0x0004 The specified Reply Path was not found the echo reply was sent via pure IP forwarding path.

FIG. 11

Flags: 1 byte of information set for ICMP request handling by CP. R is reply mode.

```
+-+-+-+-+-+-+-+-+-+-+-+-+-+-+-+-+
|       MUST be zero          |R|
+-+-+-+-+-+-+-+-+-+-+-+-+-+-+-+-+
```

0 is OUTOFBAND.
    If 0 is set means reply path is over IP routing and no reply path SID LIST is required.

1 is INBAND.
    If 1 is set means reply-path is INBAND. If this is set TLV should contain SID LIST for ICMP Reply. If no reply path exist return error in "SRv6 Reply Path return code"

Reply Path SID stack: SID stack of reply Path.

Note: If this TLV is not present, It can be assumed Reply path is not controlled.

*FIG. 12*

SEGMENT ROUTING SRV6 S-BFD AND PING REPLIES HAVING DETERMINISTIC REPLY PATH

FIELD OF THE DISCLOSURE

The present disclosure relates generally to networking and computing. More particularly, the present disclosure relates to systems and methods for Segment Routing (SR) over Internet Protocol version 6 (SRv6) Seamless-Bidirectional Forwarding Detection (S-BFD) and/or ping replies, each having a deterministic reply path.

BACKGROUND OF THE DISCLOSURE

Segment Routing over Internet Protocol version 6 (SRv6) enables a network operator or an application to specify a packet processing program by encoding a sequence of instructions in the IPV6 packet header. For example, SRv6 is described in RFC 8986, "Segment Routing over IPv6 (SRv6) Network Programming," February 2021, the contents of which are incorporated by reference in their entirety. Segment Routing, defined in RFC8402, "Segment Routing Architecture, July 2018, the contents of which are incorporated by reference in their entirety, leverages the source routing paradigm. An ingress node steers a packet through an ordered list of instructions, called "segments." Each one of these instructions represents a function to be called at a specific location in the network. A function is locally defined on the node where it is executed and may range from simply moving forward in the segment list to any complex user-defined behavior. Network Programming combines Segment Routing functions, both simple and complex, to achieve a networking objective that goes beyond mere packet routing.

There are various monitoring protocols such as S-BFD and ping that are used to verify or determine the availability of a forward and reverse path in a SRv6 network.

BRIEF SUMMARY OF THE DISCLOSURE

The present disclosure relates to systems and methods for Segment Routing (SR) over Internet Protocol version 6 (SRv6) Seamless-Bidirectional Forwarding Detection (S-BFD) and/or ping replies, each having a deterministic reply path. As described herein, S-BFD packets and ping frames are referred to as monitoring packets (also, as described herein, a packet and frame are equivalent), and the present disclosure ensures a reply to a monitoring packet takes the same path in a SRv6 network as a request that caused that reply. This overcomes the limitation of an SRv6 TE tunnel being unidirectional. Also, as described herein, the term reply and response are also equivalent.

In various embodiments, the present disclosure includes a method having steps, a node with circuitry configured to implement the steps, and a non-transitory computer-readable medium comprising instructions that, when executed, cause a node, configured to operate in a Segment Routing (SR) over Internet Protocol version 6 (SRv6) network, to perform the steps. The steps include determining a Segment Identifier (SID) list for a forward path in the SRv6 network and SID list for a reverse path in the SRv6 network; and transmitting a monitoring packet on the forward path including a Segment Routing Header (SRH) with the SID list for the forward path, and further including the SID list for the reverse path in the monitoring packet, for a SRH of a reply to the monitoring packet. The steps can further include, receiving the reply to the monitoring packet, with the reply having been on a same tunnel as the monitoring packet, for monitoring liveliness thereof. The monitoring packet can be one of Seamless-Bidirectional Forwarding Detection (S-BFD) and Bidirectional Forwarding Detection (BFD). The SRH for the reply to the monitoring packet can be in an extension header. The monitoring packet can be an Internet Control Message Protocol (ICMP) request. The SRH for the reply to the monitoring packet can be a Type-Length-Value (TLV) included therein. The SRH for the forward path and the reverse path can include one of a classical SID and a micro SID.

BRIEF DESCRIPTION OF THE DRAWINGS

The present disclosure is illustrated and described herein with reference to the various drawings, in which like reference numbers are used to denote like system components/method steps, as appropriate, and in which:

FIG. 10 is a diagram of an Internet Control Message Protocol (ICMP) message format.

FIG. 11 is a diagram of a proposed "SRv6 Reply path TLV" for inclusion in the ICMP Request.

FIG. 12 is a diagram of a flag for the "SRv6 Reply path TLV."

DETAILED DESCRIPTION OF THE DISCLOSURE

Again, the present disclosure relates to systems and methods for Segment Routing (SR) over Internet Protocol version 6 (SRv6) Seamless-Bidirectional Forwarding Detection (S-BFD) and/or ping replies, each having a deterministic reply path. As described herein, S-BFD packets and ping frames are referred to as monitoring packets (also, as described herein, a packet and frame are equivalent), and the present disclosure ensures a reply to a monitoring packet takes the same path in a SRv6 network as a request that caused that reply. This overcomes the limitation of an SRv6 TE tunnel being unidirectional. Also, as described herein, the term reply and response are also equivalent.

One problem with SRv6 is the forward path and the reverse path are not guaranteed to be the same. S-BFD is a bi-directional protocol, and, for example, to monitor a SRv6 Traffic Engineering (TE) tunnel, S-BFD can use the SRv6 TE tunnel in the forward direction, but only best-effort Internet Protocol (IP) on the return path. Unfortunately, this makes the S-BFD session unreliable, namely the forward path may be fine, but the return path may drop any reply. Ping is a technique used to determine reachability of an endpoint as well as network failures. As such, ping frame must travel in-band to identify a failure. Similar to S-BFD described above, a request ping frame is sent in-band over an SRv6 tunnel, but a reply is out-of-band, thereby failing to test both directions.

The present disclosure includes:

(1) Leverage of standard IPV6 headers and SRv6 extensions, so the techniques described herein can run on devices supporting standard SRv6, (2) Use of standard header formats, leading to improved interoperability behavior, (3) Use of an SRv6 return path will avoid indeterministic behavior on a best-effort IP path. This in turn provide improved network resiliency and stability.

(4) Use of a single approach is provided for all SRv6 standard configurations, namely, classical/micro SIDs, Penultimate Segment Pop (PSP)/Ultimate Segment Pop (USP) processing, normal/reduced Segment Routing Header (SRH), (5) For S-BFD, there is no need for an additional control stream of BFD ECHO packets for path monitoring, (6) For S-BFD, there is no S-BFD reflector configuration needed at tail node, simplifying configuration, (6) For ping, there is a controlled deterministic path for Internet Control Message Protocol version 6 (ICMPv6) reply frames.

SRv6

Figure 1:
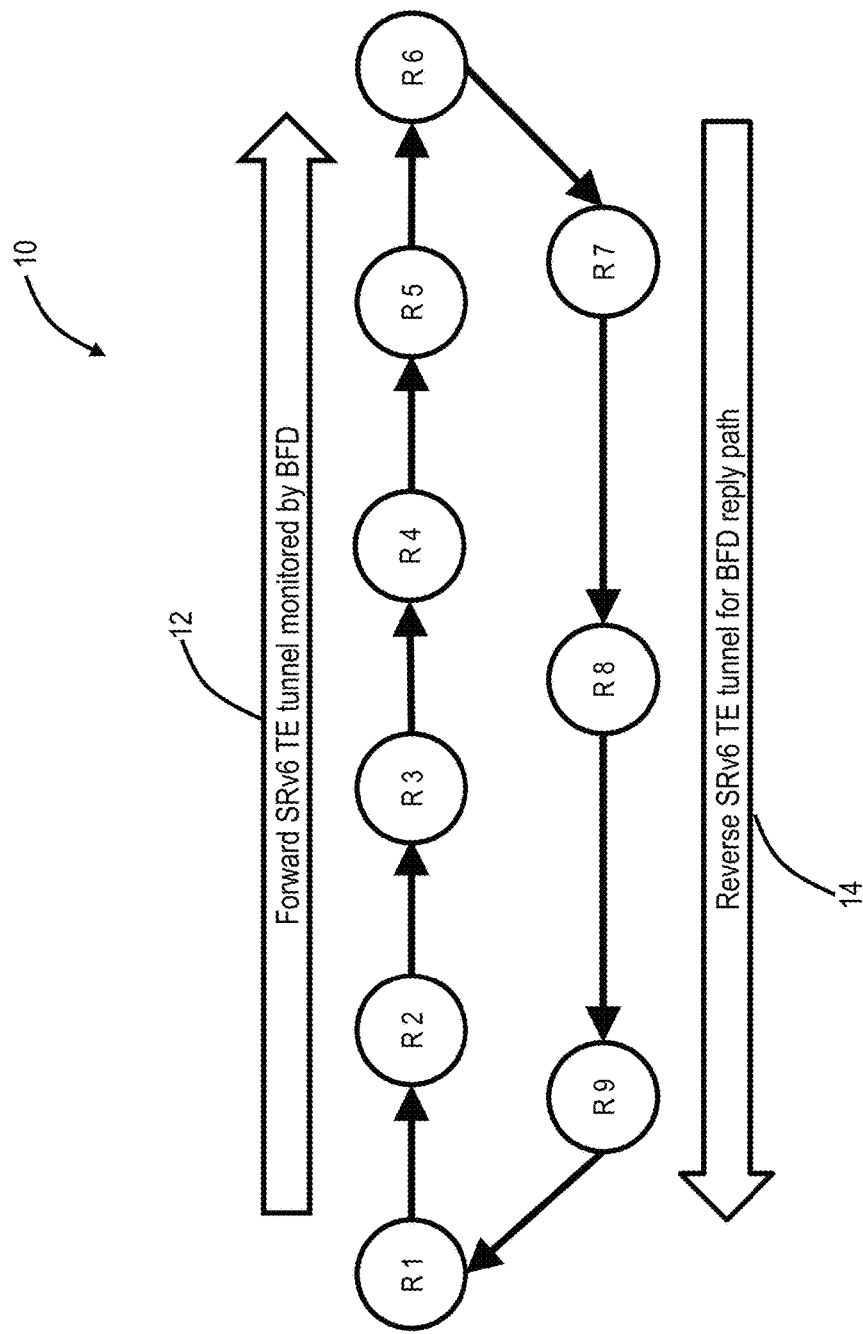
FIG. 1 is a network diagram of a network 10 with various nodes R1-R9 illustrating a forward SRv6 TE tunnel and a reverse SRv6 TE tunnel.

FIG. 1 is a network diagram of a network 10 with various nodes R1-R9 illustrating a forward SRv6 TE tunnel 12 and a reverse SRv6 TE tunnel 14. The nodes R1-R6 can be Provider Edge (PE) routers, routers, switches, etc. configured to implement SRv6. In this example, the node R1 is a headend node for the forward SRv6 TE tunnel 12 and a tailend node for the reverse SRv6 TE tunnel 14. Conversely, the node R9 is a headend node for the reverse SRv6 TE tunnel 14 and a tailend node for the forward SRv6 TE tunnel 12.

The general configuration on node Rk (where k=1-9 in FIG. 1):

(1) SRv6 SID block=B::/32 (In this example topology, 'B'=2001:db8)

(2) Node locator=B:k::/48 (e.g, Node locator for R2 will be 2001:db8:2)

(3) Function values:

0x0002: associated with endpoint behavior "End" and PSP flavor on Rk.

0x0003: associated with endpoint behavior "End" and USP flavor on Rk.

0xc000: associated with endpoint behaviour "H. Encaps" for a given SRv6-TE tunnel's Binding Segment Identifier (B-SID) on Rk as headend SRv6 Context Consider a generic SRv6 topology as depicted in FIG. 1. In SRv6 deployments, fast fault monitoring of any given SRv6 TE tunnel 12, 14 and sub 50 milliseconds traffic switchover to backup SRv6 TE tunnels are needed. Such tunnels are unidirectional in nature and so S-BFD protocol can be used to cater to these needs.

However, below problems need to be addressed with S-BFD:

(1) SRv6-TE tunnels are unidirectional. So, a bidirectional protocol like BFD or S-BFD reply can only take the best-effort IP path in reverse direction by default. However, such a BFD session would be unreliable due to unreliable reverse IP path.

(2) When some SRv6-TE tunnel is configured in the reverse direction which can be used to piggy-back S-BFD reply packets, then a well-defined mechanism needs to be in place.

(3) The mechanism must be generic and work for: Classical (128-bit) and micro (16-bit) SRv6 SIDs (uSID), PSP and USP flavors of processing SRH, Normal and reduced SRH, and Software or Hardware implementations of BFD.

(4) There is no standard or work-in-progress end-to-end solutions available in SRv6 environment which offer reliability using BFD/S-BFD.

Fault Monitoring of SRv6-TE Forward Path with SRv6-TE Reply Path

Figure 2:
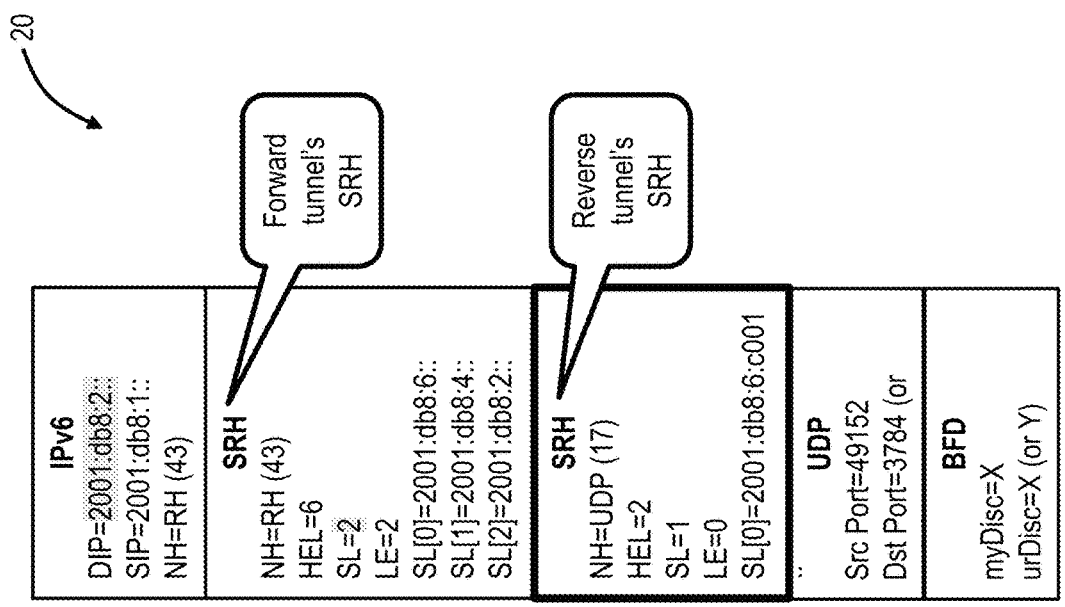
FIG. 2 is a block diagram of an example S-BFD Continuity Check (CC) request packet, from the node R1 to the node R6.

The present disclosure includes a request packet (e.g., BFD, S-BFD) having a segment list of the forward SRv6 TE tunnel along with a B-SID of a reverse SRv6-TE tunnel for use at the tailend node for a reply, to reliably monitor the liveness of forward SRv6-TE tunnel. FIG. 2 is a block diagram of an example S-BFD Continuity Check (CC) request packet 20, from the node R1 to the node R6. The request packet 20 includes an IPV6 header with a Destination IP (DIP) address and a Source IP (SIP) address, followed by a forward tunnel SRH, followed by a reverse tunnel SRH, and with the S-BFD payload encapsulated over a User Datagram Protocol (UDP). Separating the forward and reverse SRH helps to navigate both PSP and USP cases. In both mechanisms, BFD/S-BFD monitoring is being performed using B-SID of reverse SRv6-TE tunnel. Reverse B-SID is being transmitted as a separate SRH header in SRv6 packet in forward path. When using S-BFD mechanism, S-BFD Continuity Check (CC) request and reply packets are being used for fault monitoring on SRv6-TE tunnels. No BFD/S-BFD ECHO packets is being used in this mechanism.

Operational Cases

Figure 3:
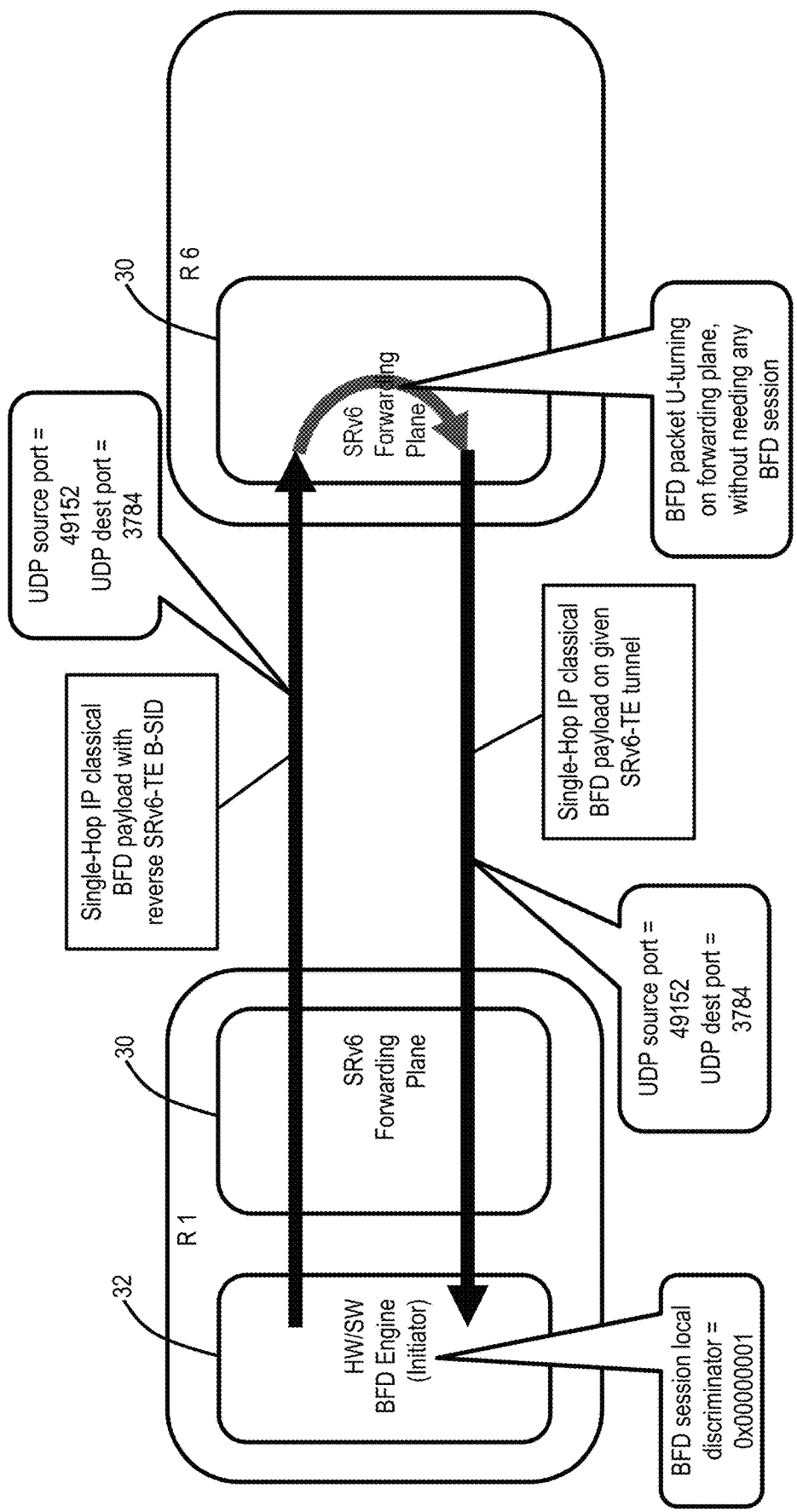
FIG. 3 is a network diagram of the nodes R1, R6 from the network of FIG. 1 illustrating a classical BFD mechanism at the headend node R1 with no BFD configuration on the tailend node R6.
Figure 4:
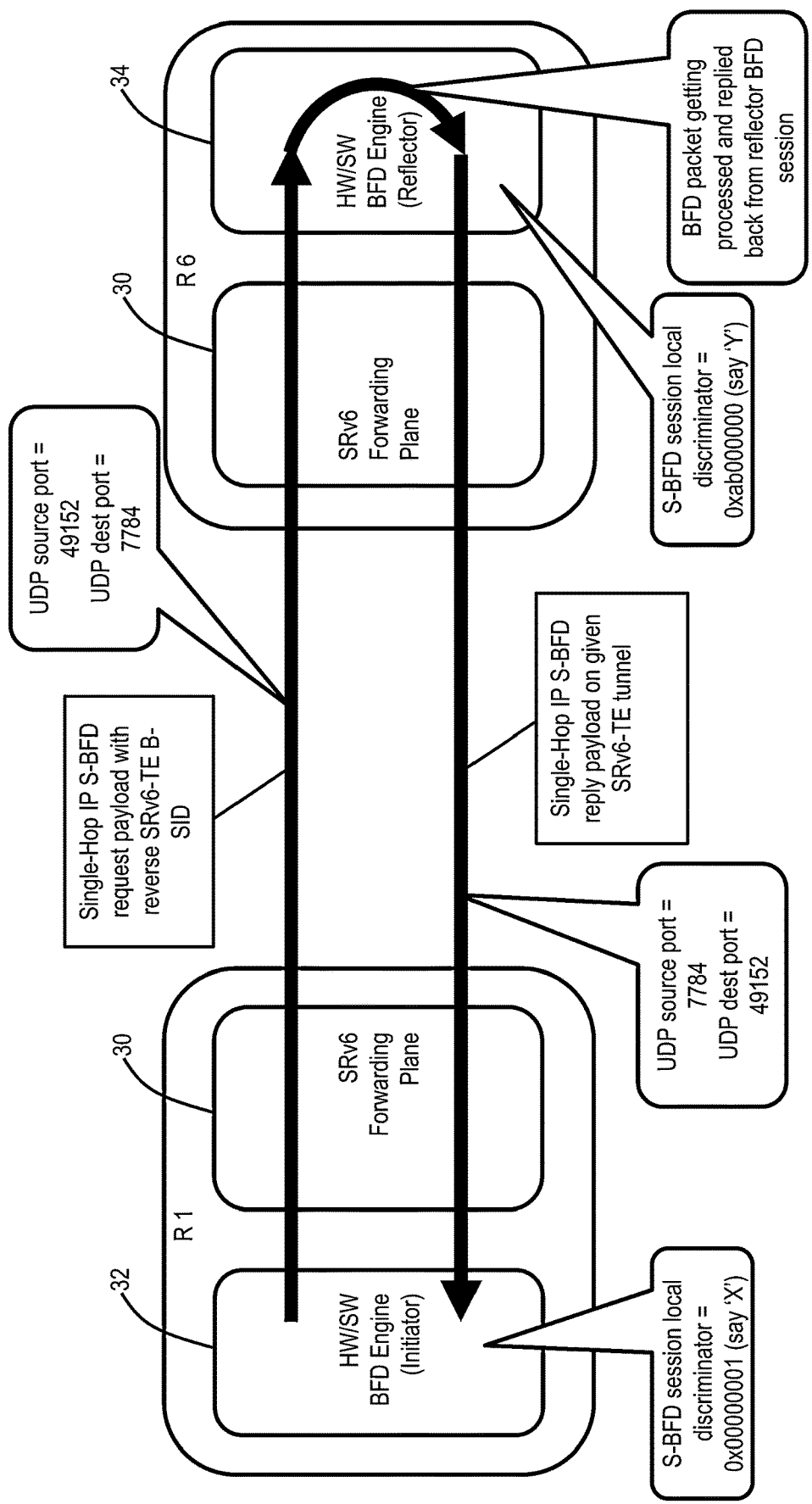
FIG. 4 is a network diagram of the nodes R1, R6 from the network of FIG. 1 illustrating a S-BFD mechanism at the headend node R1 with a reflector session on the tailend node R6.

FIG. 3 is a network diagram of the nodes R1, R6 from the network 10 illustrating a classical BFD mechanism at the headend node R1 with no BFD configuration on the tailend node R6. FIG. 4 is a network diagram of the nodes R1, R6 from the network 10 illustrating a S-BFD mechanism at the headend node R1 with a reflector session on the tailend node R6. In both FIGS. 3 and 4, the nodes R1, R6 includes an SRv6 forwarding plane 30, which is a logical representation of the hardware (circuitry), software, and/or firmware for sending packets (frames) compliant to SRv6. The node R1 includes a BFD engine 32 which also includes hardware (circuitry), software, and/or firmware for initiating BFD sessions. In FIG. 3, there is no BFD configuration on the tailend node R6. In FIG. 4, the tailend node R6 includes a BFD engine 34 which includes hardware (circuitry), software, and/or firmware for a reflector session.

In FIG. 3, the BFD engine 32 initiates a BFD packet for transmission via the SRv6 forwarding plane 30 to the node R6, namely a Single-Hop IP classical BFD payload with reverse SRv6-TE B-SID, and a UDP source and destination port. At the node R6, the SRv6 forwarding plane 30 is configured to perform BFD packet U-turning on forwarding plane, without needing any BFD session. This provides a Single-Hop IP classical BFD payload on given SRv6-TE tunnel with the UDP source and destination port, and the BFD engine 32 receives the reply with the BFD session local discriminator.

In FIG. 4, the BFD engine 32 initiates a BFD packet for transmission via the SRv6 forwarding plane 30 to the node R6, namely a Single-Hop IP classical BFD payload with reverse SRv6-TE B-SID, and a UDP source and destination. The node R6 includes the BFD engine 34 where the BFD packet is processed and replied back from reflector BFD session, with a S-BFD session local discriminator=0xab000000 (say 'Y').

Figure 5:
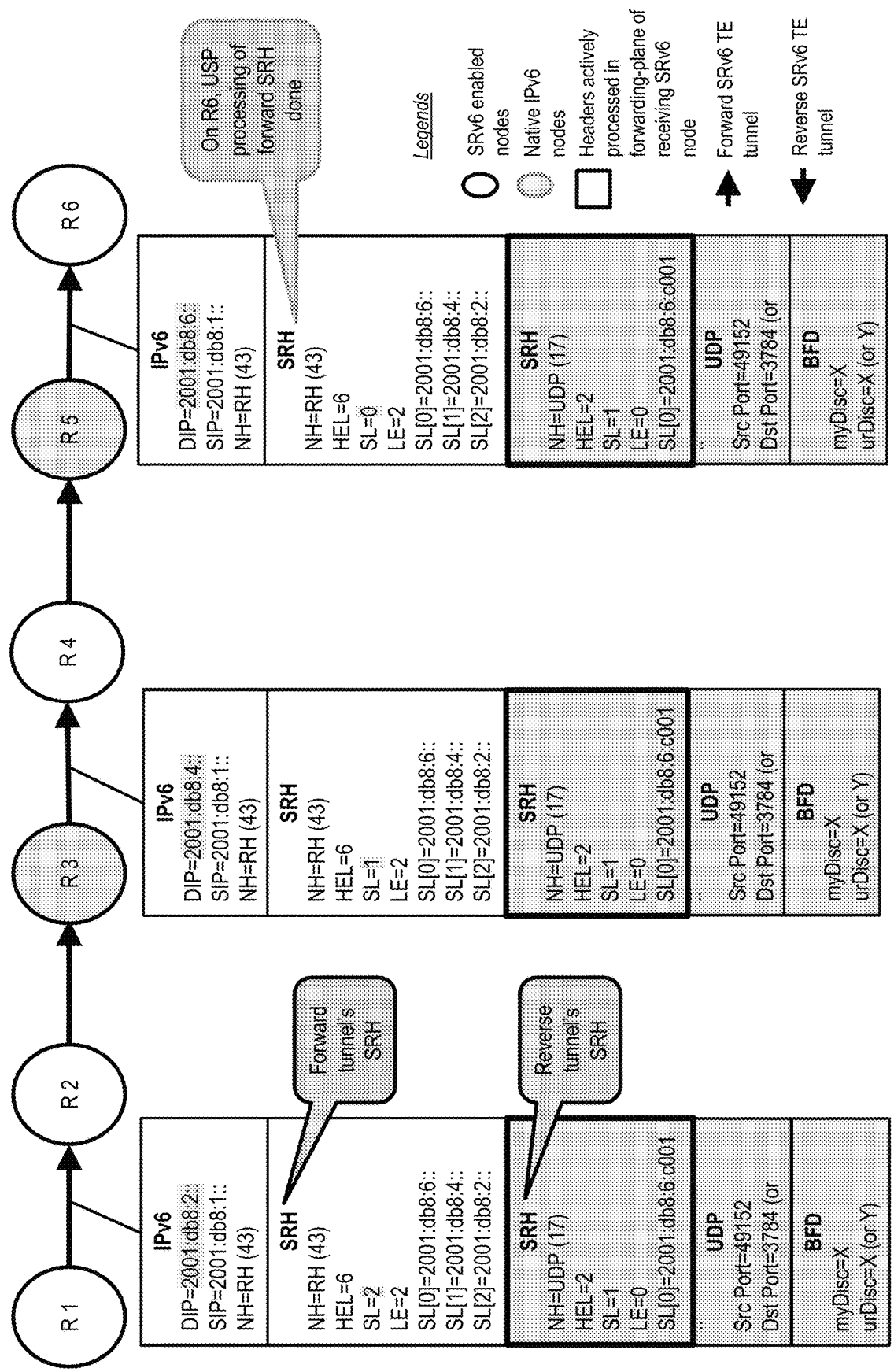
FIG. 5 is a network diagram of a forward SRv6-TE (Traffic Engineering) tunnel packet flow using 128-bit length Classical SIDs-Case 1-Normal SRH, USP flavor.
Figure 6:
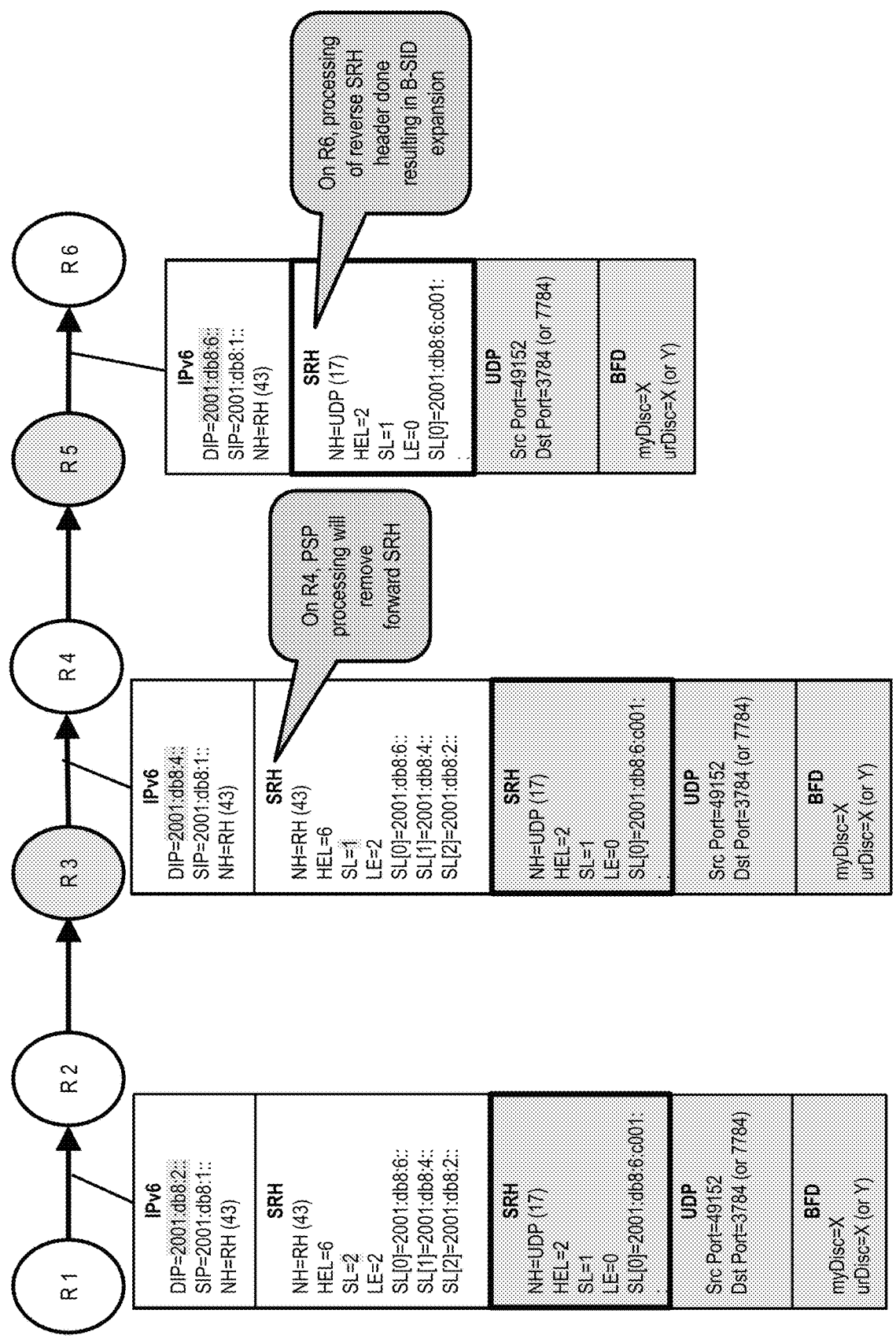
FIG. 6 is a network diagram of a forward SRv6-TE tunnel packet flow using 128-bit length Classical SIDs-Case 2-Normal SRH, PSP flavor.

In both FIGS. 3 and 4, after traversing all SRv6-enabled and native IPv6 nodes in the forward tunnel path, the packet will reach tail node either with Segment-Left=0 in intact forward SRH (USP case in FIG. 5) or with only reverse SRH with Segment-Left=1 (PSP case in in FIG. 6). In both these cases, any forward SRH will be discarded and reverse SRH processed. B-SID expansion for reverse SRH will happen on tail node and S-BFD reply packets will be transmitted on the corresponding reverse tunnel. The final S-BFD reply packets can be either looped-back in forwarding-plane or can be internally routed via a S-BFD reflector session. So, S-BFD reflector session configuration is optional at tail-node, since all the reverse path information is already available in the request packet.

Back on the head node, the packet is identified as S-BFD reply using the standard UDP destination-port (7784) and de-multiplexed to the appropriate initiator session using the your-discriminator. In the case when there is no reflector session at tail node, an enhanced S-BFD Finite State Machine (FSM) is maintained at initiator, specifically to handle DOWN state in incoming reply packet when local state is also DOWN, and then moving local state to UP.

NOTE: Other security and BFD authentication aspects remain same as already defined in RFCs 7880, 7881, 8754 and 8986, the contents of which are incorporated by reference.

SRv6 Example Scenarios

FIGS. 5-9 illustrate various SRv6 example scenarios, including:

128-bit length Classical SIDs-On forward path (BFD request packet)—(1) Normal SRH, USP on tailnode, and (2) Normal SRH, PSP on previous SRv6 hop of tailnode (Reduced SRH case is similar), and on reverse path (BFD reply packet) Normal SRH, USP on headnode (Reduced SRH and PSP cases would be similar).

16-bit length Micro SIDs-On forward path (BFD request packet) Normal SRH, USP on tailnode (Reduced SRH and PSP cases in forward/reverse paths would be similar).

In the various diagrams, packets are shown with IPv6 headers, a forward tunnel SRH, a reverse tunnel SRH, UDP header, and BFD header. The acronyms include DIP (Destination IP address), SIP (Source IP address), NH (Network/Next Header), RH (Routing Header), HEL (Header Ext. Length), SL (Segments Left), LE (Last Entry), SL (Segment List), etc.

FIG. 5 is a network diagram of a forward SRv6-TE tunnel packet flow using 128-bit length Classical SIDs-Case 1-Normal SRH, USP flavor.

FIG. 6 is a network diagram of a forward SRv6-TE tunnel packet flow using 128-bit length Classical SIDs-Case 2-Normal SRH, PSP flavor.

Figure 7:
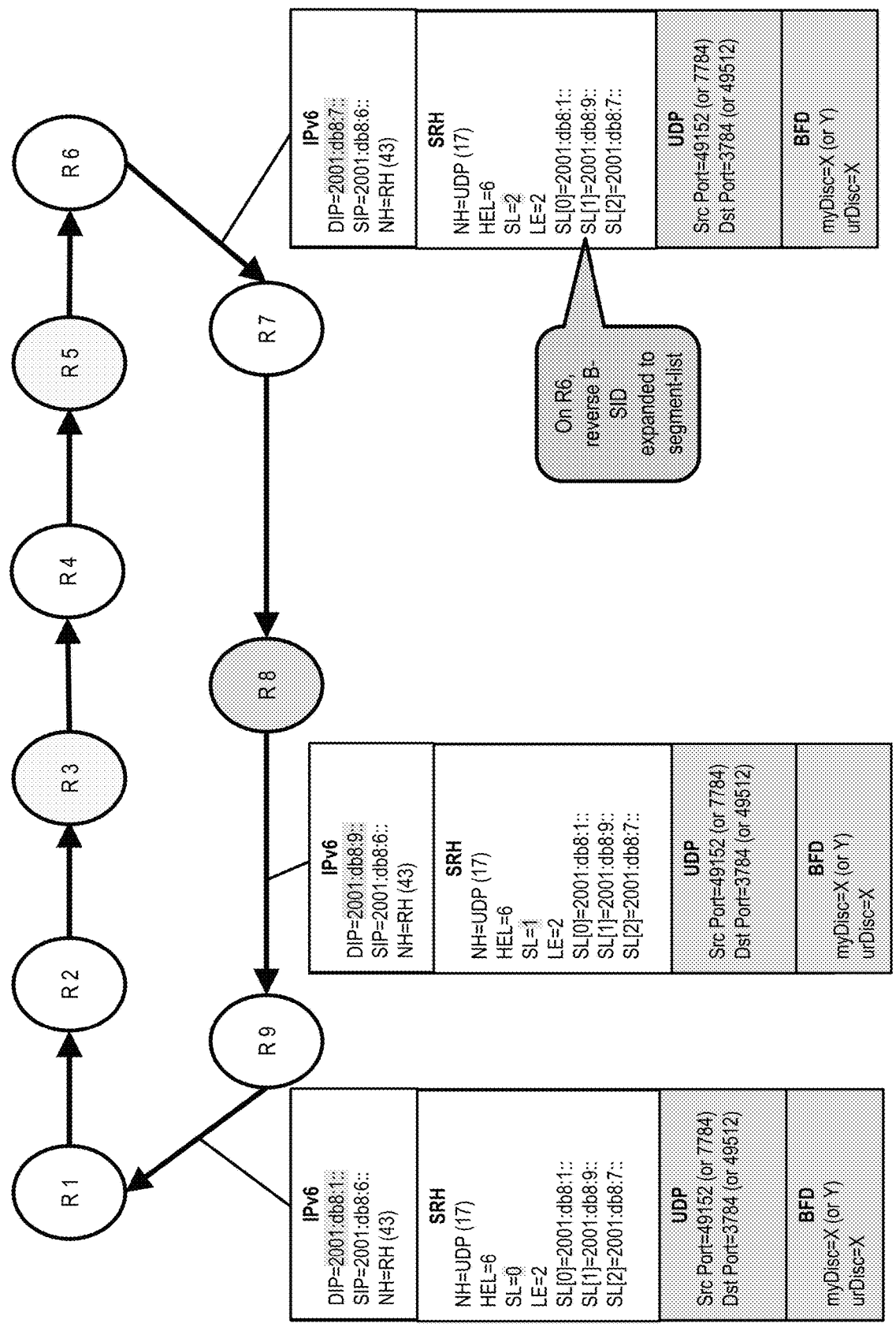
FIG. 7 is a network diagram of a reverse SRv6-TE tunnel packet flow using 128-bit length Classical SIDs-Case 3-Normal SRH, USP flavor.

FIG. 7 is a network diagram of a reverse SRv6-TE tunnel packet flow using 128-bit length Classical SIDs-Case 3-Normal SRH, USP flavor.

Figure 8:
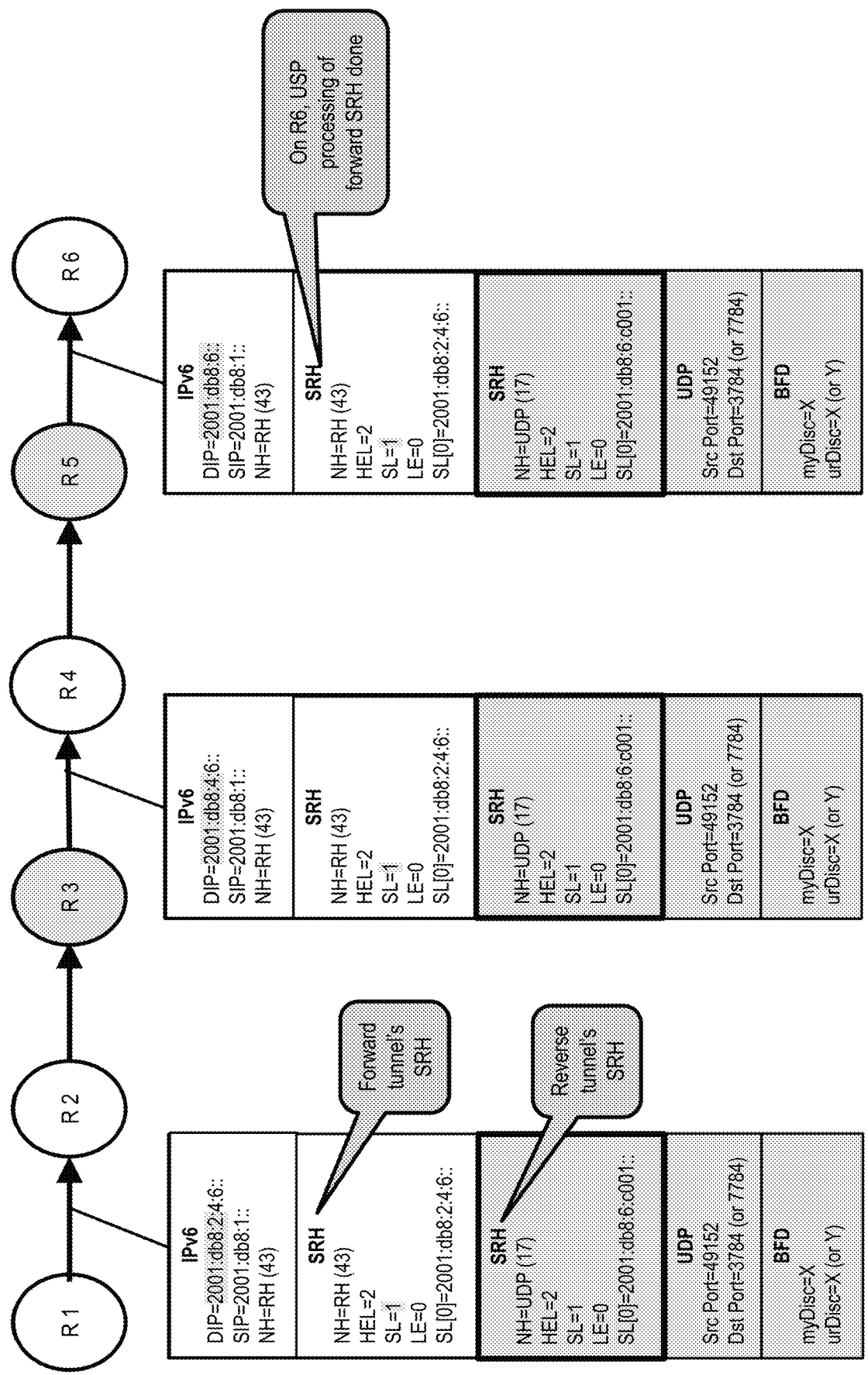
FIG. 8 is a network diagram of a forward SRv6-TE tunnel packet flow using 16-bit length Micro SIDs-Case 4-Normal SRH, USP flavor.

FIG. 8 is a network diagram of a forward SRv6-TE tunnel packet flow using 16-bit length Micro SIDs-Case 4-Normal SRH, USP flavor.

Figure 9:
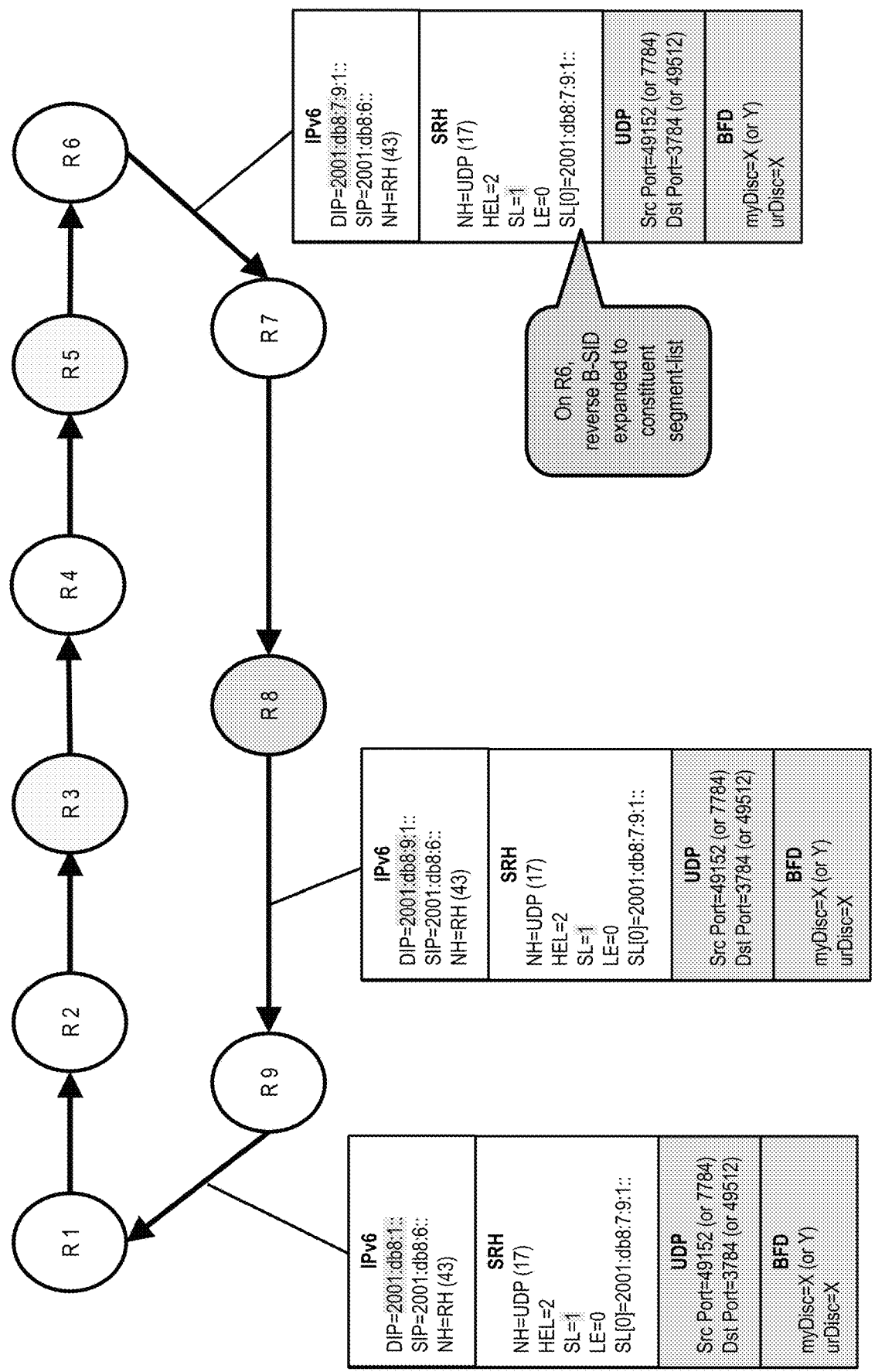
FIG. 9 is a network diagram of a reverse SRv6-TE tunnel packet flow using 16-bit length Micro SIDs-Case 5-Normal SRH, USP flavor.

FIG. 9 is a network diagram of a reverse SRv6-TE tunnel packet flow using 16-bit length Micro SIDs-Case 5-Normal SRH, USP flavor.

Ping

In standard RFCs for SRv6/IPV6 Operations, Administration, and Maintenance (OAM), no known solution exists where the head-node (or initiator) can control the ICMPv6 explicit reply path (including SRv6-TE paths). To that end, and similar as the SRv6 example for S-BFD case, the present disclosure includes explicit information for the reply path, namely a new Type-Length-Value (TLV) which can be referred to as a "SRv6 Reply path TLV" for controlled reply path.

In IP and Multiprotocol Label Switching (MPLS) network Ping and Traceroute are most widely used OAM tools for troubleshooting the network. The network may span across multiple domains/autonomous systems where no other protocol except Ping and Traceroute may seamlessly identify and isolate the network fault. Ping and Traceroute frames must travel in-band to identify the network failure. As described herein, in-band means the frames (or packets) traverse a forward path that is being monitored, namely the frames go over the network segments, hops, etc. which are being monitored. Conversely, out-of-band means the frames do not necessarily travel the same network segments, hops, etc. which are being monitored. In the SRv6 S-BFD case above, in-band means the SRv6 tunnel being monitoring, and out-of-band means an IP reverse path. Similarly, in Ping, the in-band can mean an SRv6 tunnel (e.g., SRv6 TE path) whereas the out-of-band means an IP reverse path. If Ping reply frames are carried over out-of-band, it is possible is successful in-band, but not out-of-band, thereby being unreliable.

In SRv6 networks, SID's known as LOCATORS and FUNCTIONS in via a 128-byte format are shared over Interior Gateway Protocol (IGP)/Border Gateway Protocol (BGP) to other nodes. Suppose as SRv6 traffic engineered path is created between end-nodes. To perform end to end connectivity check, the Ping utility is used, where ICMP Request and Response frames are sent and received respectively. For each ICMPv6 Request (Type=128), if there is ICMP Reply (Type=129) received, then Ping is successful else Ping has failed.

Ping to SRv6-TE policy adds the segments in the SRH of IPV6 header in an ICMPv6 frame, and the frame is sent out on the wire. This ICMPv6 request frame shall visit all nodes mentioned in the encoded SRH and reach the end node, namely in-band. However, the ICMPv6 reply frame is over IP path, i.e., out-of-band. As per the current solution, ICMPv6 has no mechanism to inform the Reply path on responder node so that ICMPv6 reply frame is carried over in-band.

Ping Controlled Reply Path Solution

The present disclosure proposes a new TLV sent in the ICMP Request (Type=128) which is processed at the responder node. This TLV contains the reply Path information for ICMP Reply frame (Type=129). This Reply path will be encoded in the SRH of IPV6 header of ICMP reply frame. Thus, the reply path will travel in-band as requested by controller/user from the Initiator node. FIG. 10 is a diagram of an ICMP message format.

FIG. 11 is a diagram of a proposed "SRv6 Reply path TLV" for inclusion in the ICMP Request. This new TLV can have a new type of 2-byte decimal value assigned by the Internet Assigned Numbers Authority (IANA). The length can be the length of data in the TLV. There can be a SRv6 Reply Path return code for errors detected by control plane with respect to reply path availability. Examples of these return codes are in FIG. 11.

FIG. 12 is a diagram of a flag for the "SRv6 Reply path TLV." The flag can be used by the Control Plane (CP) and can be in the ICMP request to state the reply mode, e.g., out-of-band or in-band. Of course, if the "SRv6 Reply path TLV" is not present, the reply path is not controlled, i.e., it can be either out-of-band or in-band.

Figure 13:
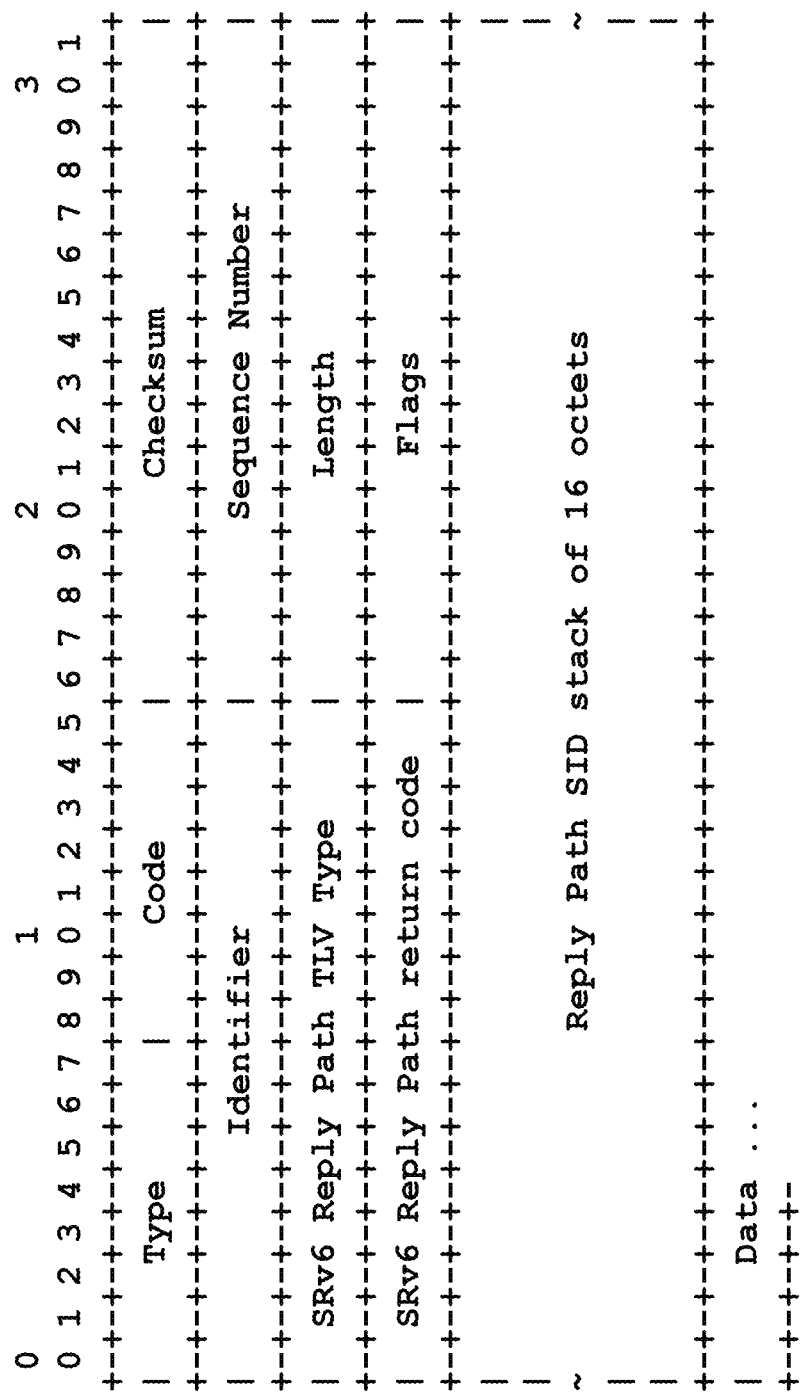
FIG. 13 is a diagram of an ICMP message encoded with the reply path TLV.

FIG. 13 is a diagram of an ICMP message encoded with the reply path TLV. Note, the "SRv6 Reply path TLV" for ICMP requests and the reverse tunnel SRH can both be referred to as controlled reply path information that is provided in a request.

Figure 14:
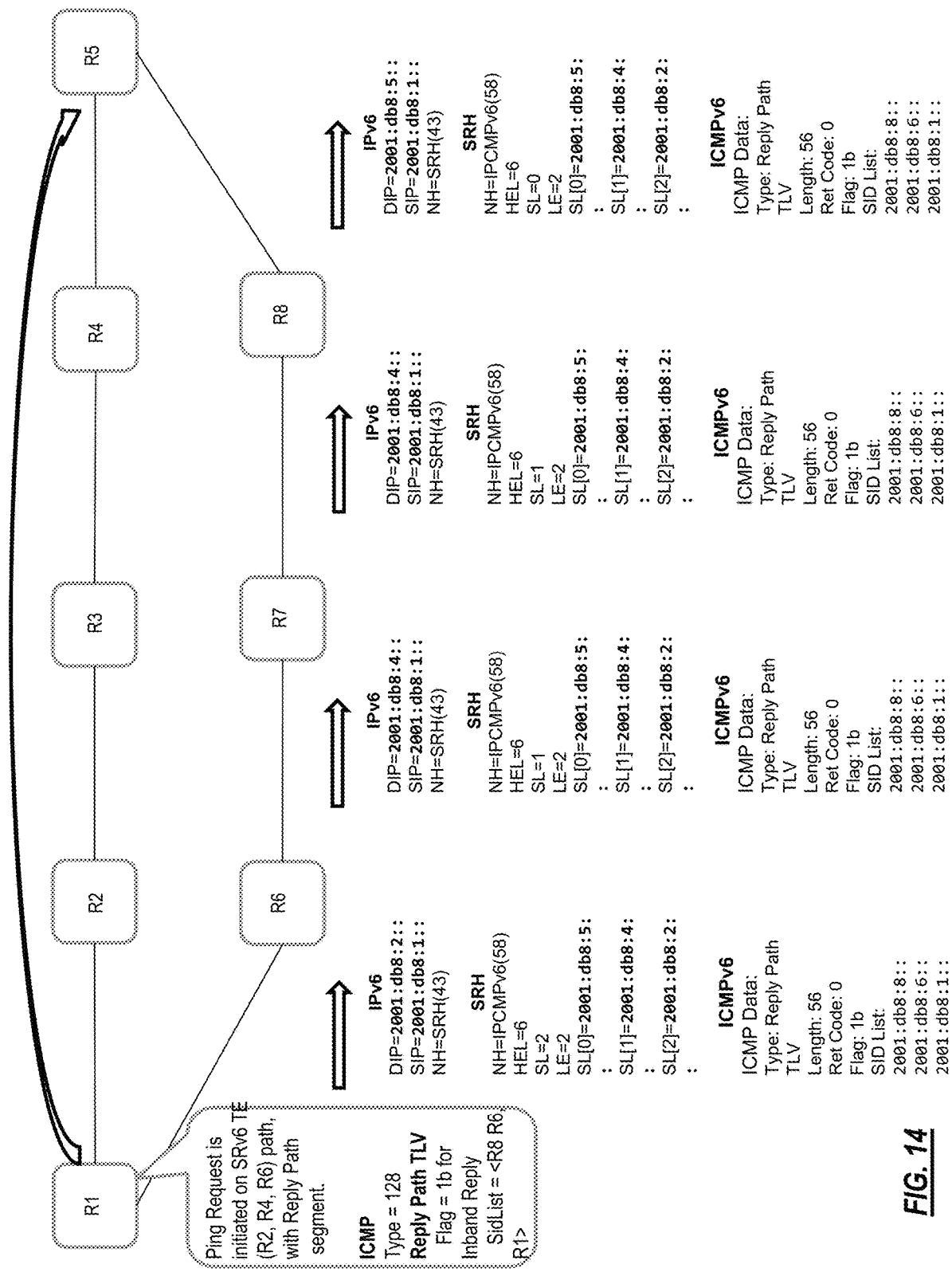
FIG. 14 is a network diagram of a SRv6 OAM ICMP Request in-band with a controlled Reply path TLV using a classical SID.
Figure 15:
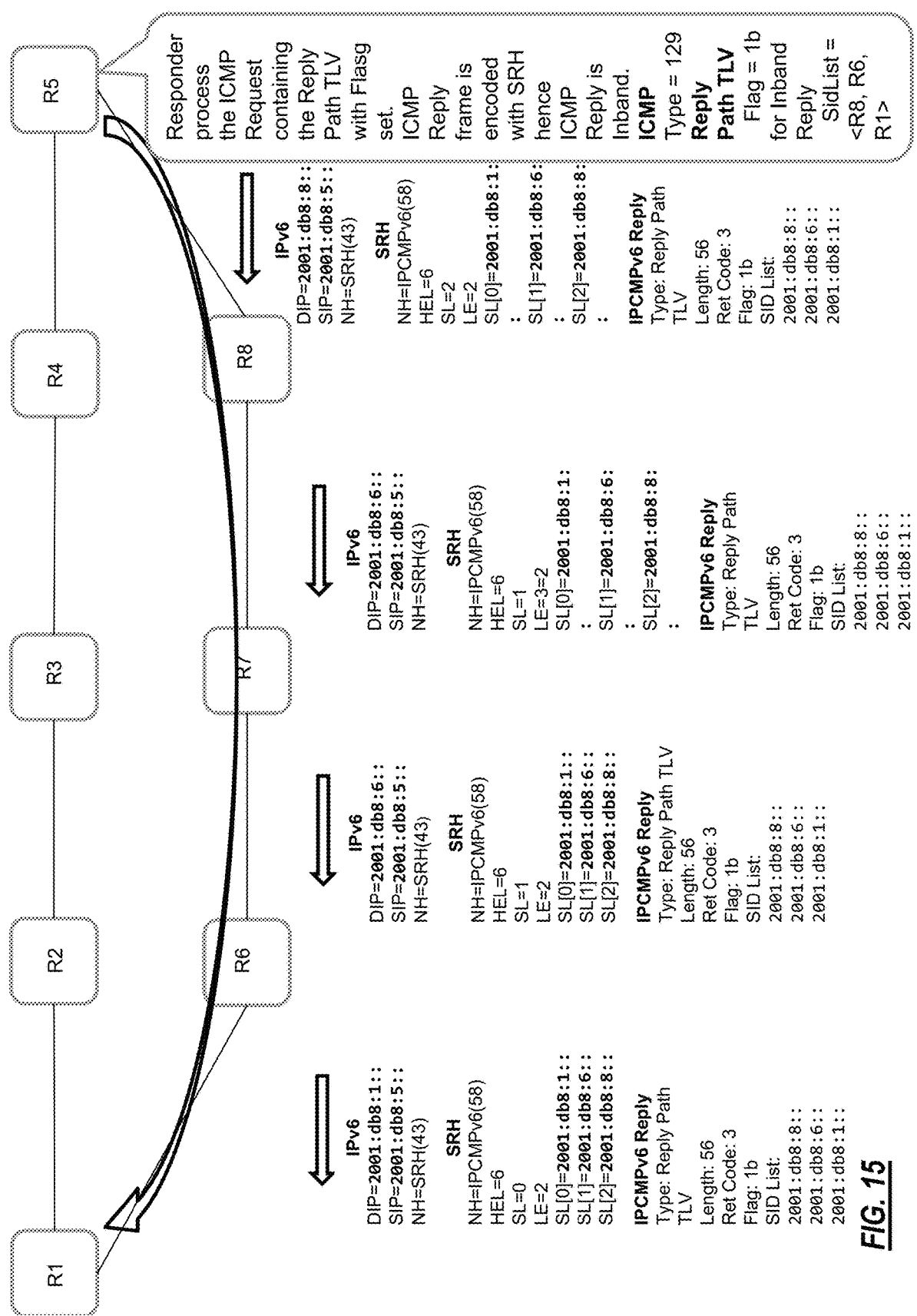
FIG. 15 is a network diagram of a SRv6 OAM ICMP Response in-band with a controlled Reply path TLV using a classical SID.
Figure 16:
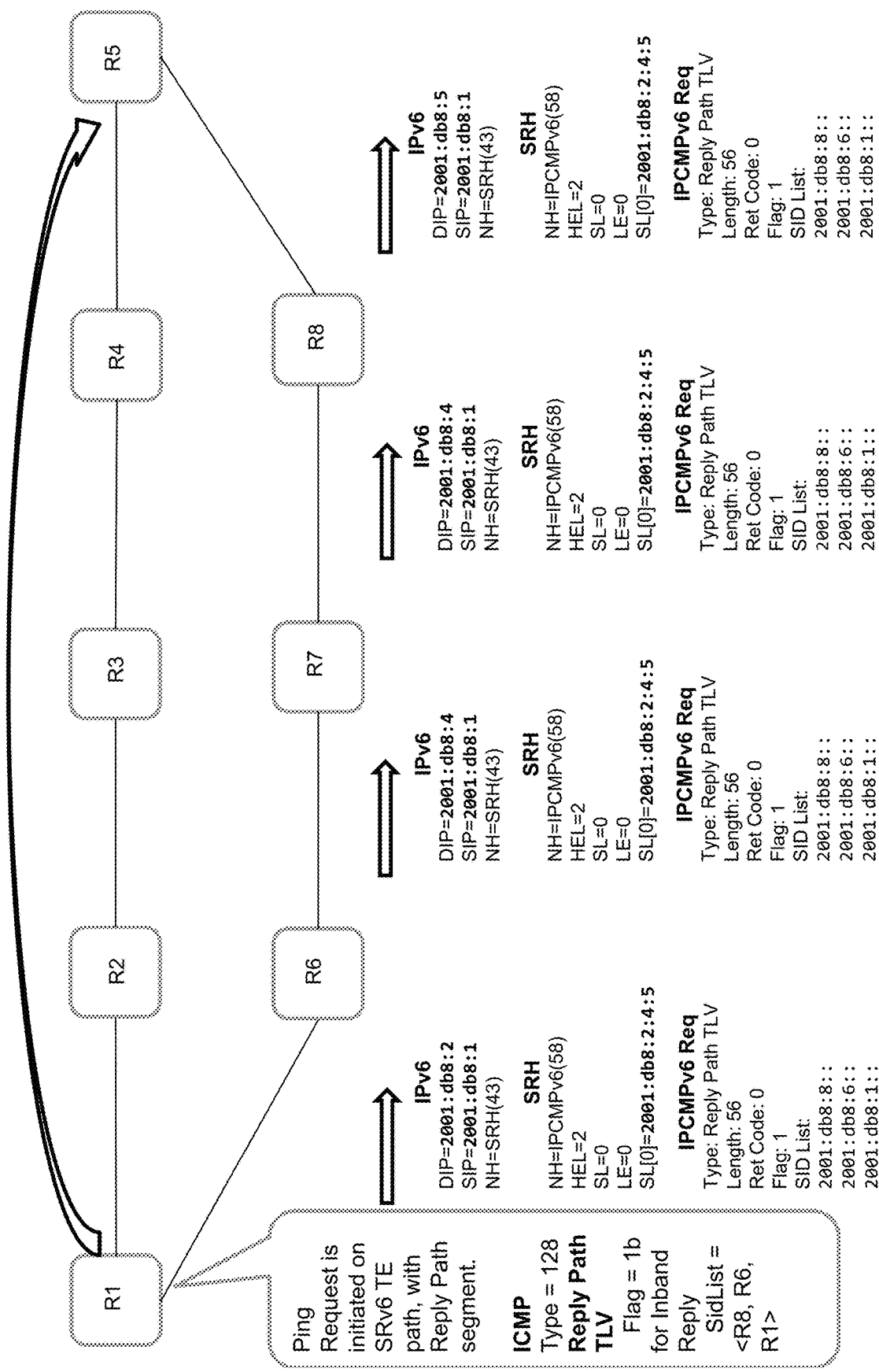
FIG. 16 is a network diagram of a SRv6 OAM ICMP Request in-band with a controlled Reply path TLV using a micro SID.
Figure 17:
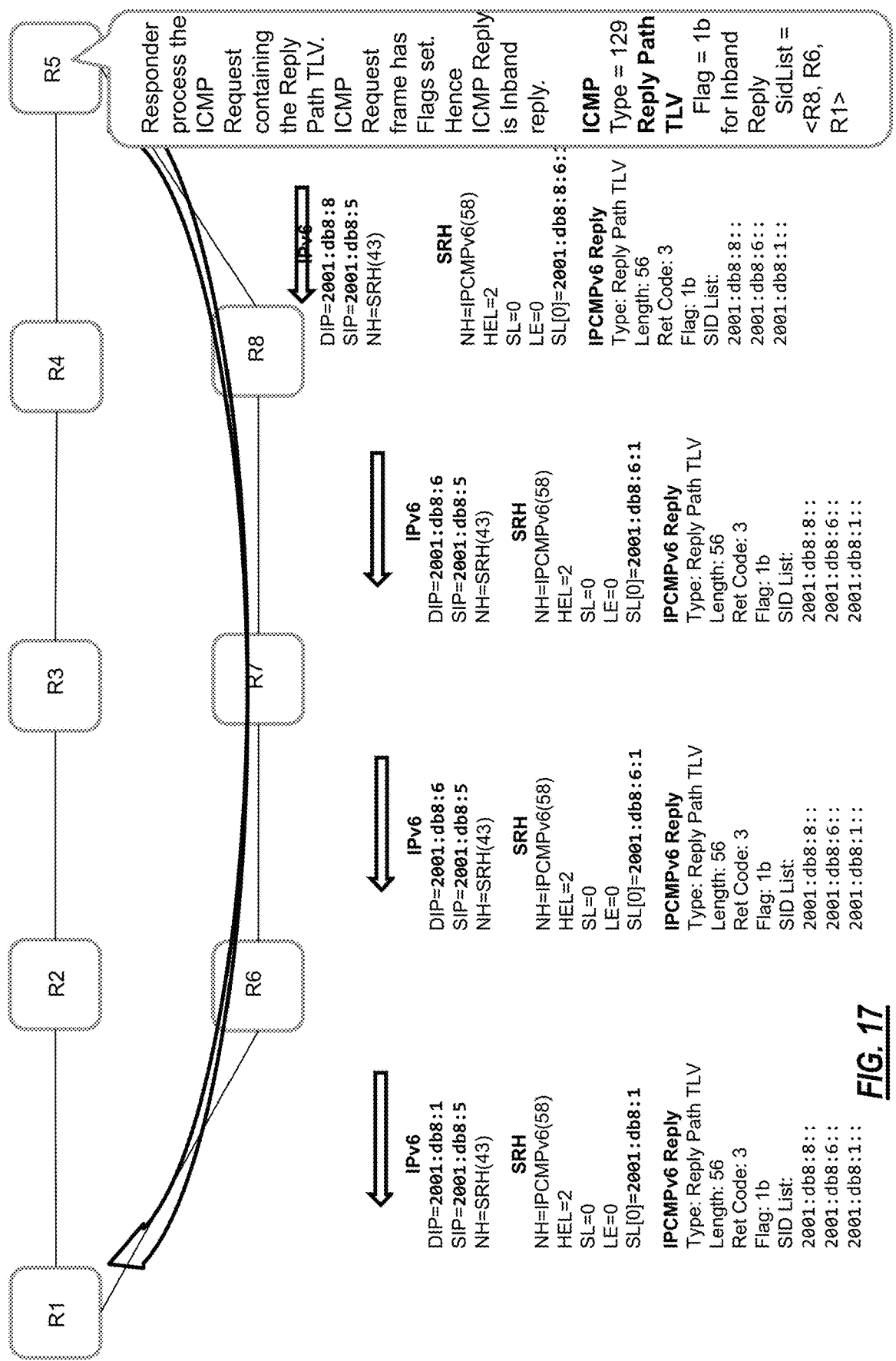
FIG. 17 is a network diagram of a SRv6 OAM ICMP Response in-band with a controlled Reply path TLV using a micro SID.

FIGS. 14-17 are network diagrams of example SRv6 OAM ICMP requests and responses. FIG. 14 is a network diagram of a SRv6 OAM ICMP Request in-band with a controlled Reply path TLV using a classical SID. FIG. 15 is a network diagram of a SRv6 OAM ICMP Response in-band with a controlled Reply path TLV using a classical SID. FIG. 16 is a network diagram of a SRv6 OAM ICMP Request in-band with a controlled Reply path TLV using a micro SID. FIG. 17 is a network diagram of a SRv6 OAM ICMP Response in-band with a controlled Reply path TLV using a micro SID.

Now user will have flexibility to control the reply path over out-of-band/in-band over different segments.

Example Node

Figure 18:
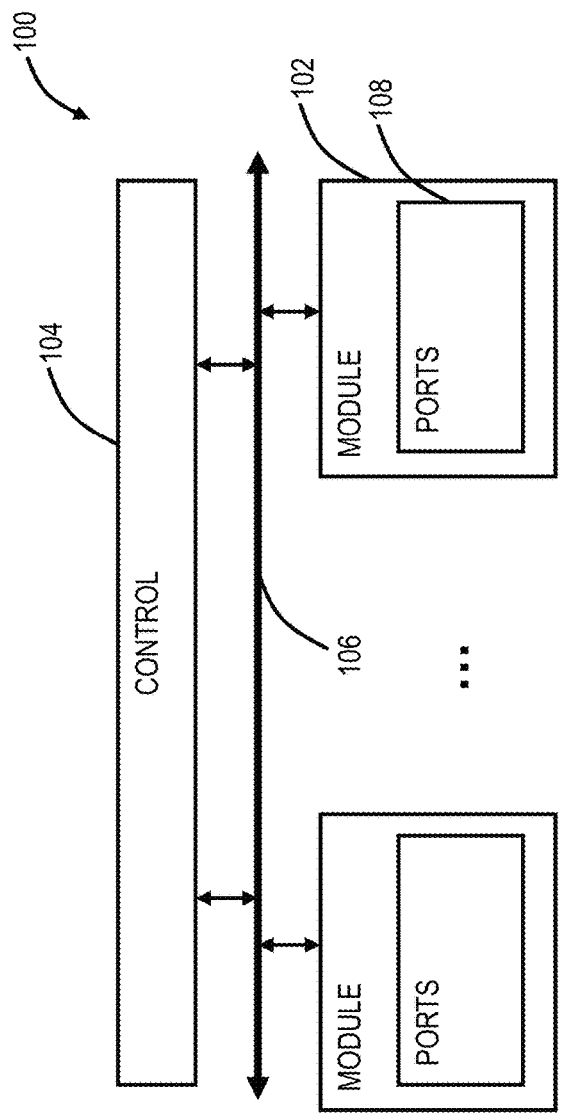
FIG. 18 is a block diagram of an example implementation of a node, such as a router configured to transmit S-BFD and Ping utilizing the various embodiments described herein.

FIG. 18 is a block diagram of an example implementation of a node 100, such as a router configured to transmit S-BFD and Ping utilizing the various embodiments described herein. Those of ordinary skill in the art will recognize FIG. 18 is a functional diagram in an oversimplified manner, and a practical embodiment may include additional components and suitably configured processing logic to support known or conventional operating features that are not described in detail herein.

In an embodiment, the node 100 is a packet switch, but those of ordinary skill in the art will recognize the systems and methods described herein can operate with other types of network elements and other implementations that support SR networking. In this embodiment, the node 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the node 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the node 100 out by the correct port 108 to the next node 100. "Switching fabric" includes switching units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the node 100. The network interface may be utilized to communicate with an element manager, a network management system, etc. Additionally, the control module 104 can include a database that tracks and maintains provisioning, configuration, operational data, and the like.

Again, those of ordinary skill in the art will recognize the node 100 can include other components which are omitted for illustration purposes, and that the systems and methods described herein are contemplated for use with a plurality of different network elements with the node 100 presented as an example type of network element. For example, in another embodiment, the node 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 18 is meant to provide a functional view, and those of ordinary skill in the art will recognize actual hardware implementations may vary.

Example Controller

Figure 19:
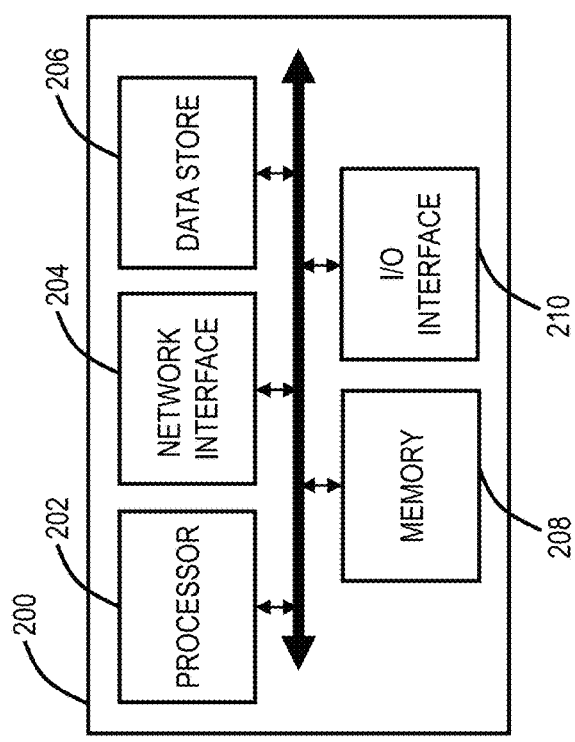
FIG. 19 is a block diagram of an example processing device 200, which can form a control module for the node of FIG. 18, etc.

FIG. 19 is a block diagram of an example processing device 200, which can form a control module for the node 100, etc. The processing device 200 can be part of the node 100, or a stand-alone device communicatively coupled to the node 100. Also, the processing device 200 can be referred to in implementations as a control module, a shelf controller, a shelf processor, a system controller, etc. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, to the nodes, a PCE, an SDN controller, and the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

Process

Figure 20:
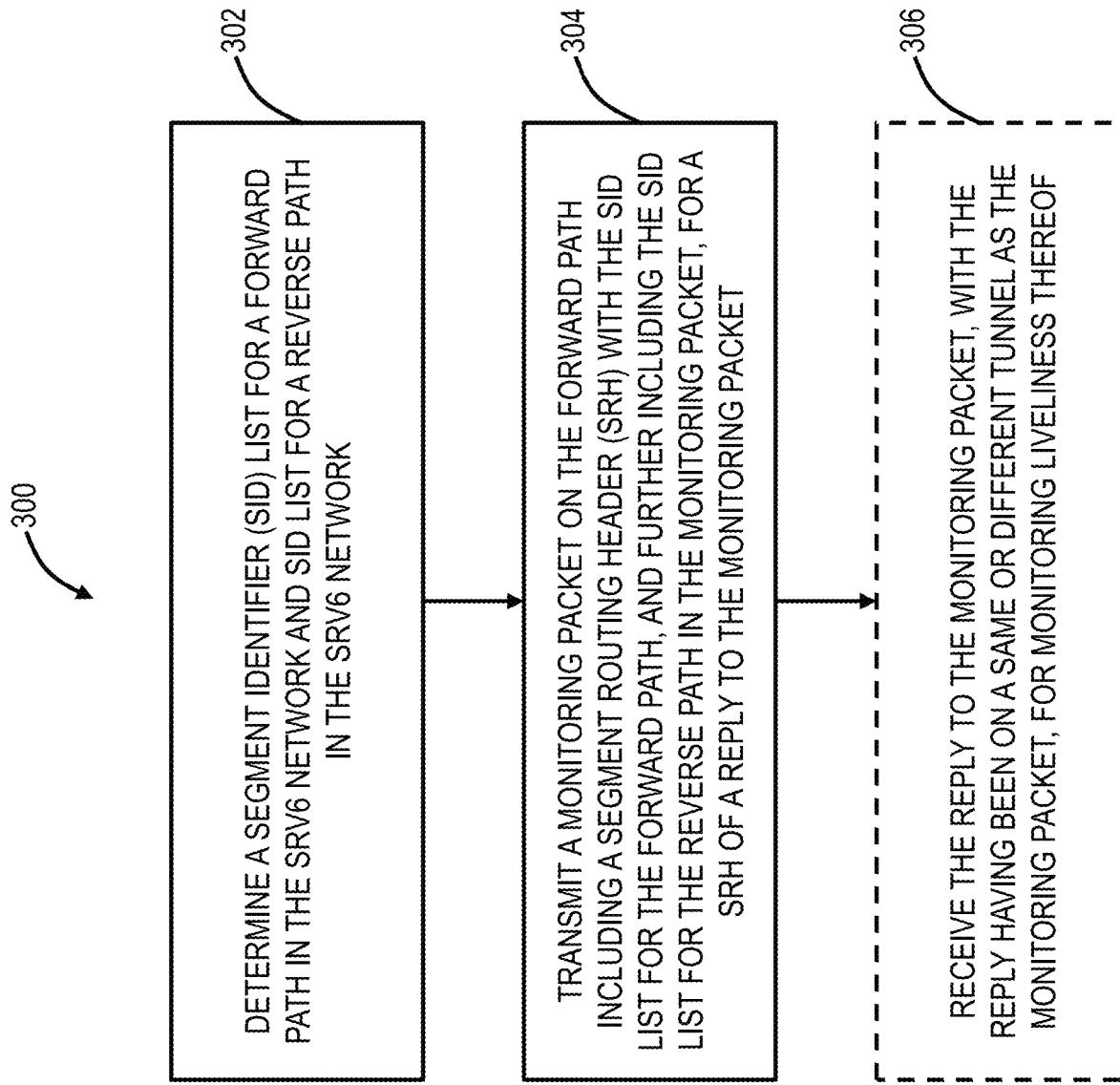
FIG. 20 is a flowchart of a liveliness check process configured to operate in an SRv6 network.

FIG. 20 is a flowchart of a liveliness check process 300 configured to operate in an SRv6 network. The liveliness check process 300 contemplates implementation in the node 100, as a method, and as a non-transitory computer-readable medium with instructions that, when executed, cause a node to perform the liveliness check process 300.

The liveliness check process 300 includes determining a Segment Identifier (SID) list for a forward path in the SRv6 network and SID list for a reverse path in the SRv6 network (step 302); and transmitting a monitoring packet on the forward path including a Segment Routing Header (SRH) with the SID list for the forward path, and further including the SID list for the reverse path in the monitoring packet, for a SRH of a reply to the monitoring packet (step 304). The liveliness check process 300 can further include receiving the reply to the monitoring packet, with the reply having been on a same or different tunnel as the monitoring packet, for monitoring liveliness thereof (step 306).

The monitoring packet can be one of Seamless-Bidirectional Forwarding Detection (S-BFD) and Bidirectional Forwarding Detection (BFD). The SRH for the reply to the monitoring packet can be in an extension header. The monitoring packet can be an Internet Control Message Protocol (ICMP) request. The SRH for the reply to the monitoring packet can be a Type-Length-Value (TLV) included therein. The SRH for the forward path and the reverse path can include one of a classical SID and a micro SID.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A node configured to operate in a Segment Routing (SR) over Internet Protocol version 6 (SRv6) network, the node comprising circuitry configured to:
    determine a Segment Identifier (SID) list for a forward path in the SRv6 network and SID list for a reverse path in the SRv6 network; and
    transmit a monitoring packet on the forward path including a Segment Routing Header (SRH) with the SID list for the forward path, and further including the SID list for the reverse path in the monitoring packet, for a SRH of a reply to the monitoring packet.

2. The node of claim 1, wherein the circuitry is configured to receive the reply to the monitoring packet, with the reply having been on a same or different tunnel as the monitoring packet, for monitoring liveliness thereof.

3. The node of claim 1, wherein the monitoring packet is one of Seamless-Bidirectional Forwarding Detection (S-BFD) and Bidirectional Forwarding Detection (BFD).

4. The node of claim 3, wherein the SRH for the reply to the monitoring packet is in an extension header.

5. The node of claim 1, wherein the monitoring packet is an Internet Control Message Protocol (ICMP) request.

6. The node of claim 5, wherein the SRH for the reply to the monitoring packet is a Type-Length-Value (TLV) included therein.

7. The node of claim 1, wherein the SRH for the forward path and the reverse path includes one of a classical SID and a micro SID.

8. A non-transitory computer-readable medium comprising instructions that, when executed, cause a node, configured to operate in a Segment Routing (SR) over Internet Protocol version 6 (SRv6) network, to perform steps of:
    determining a Segment Identifier (SID) list for a forward path in the SRv6 network and SID list for a reverse path in the SRv6 network; and
    transmitting a monitoring packet on the forward path including a Segment Routing Header (SRH) with the SID list for the forward path, and further including the SID list for the reverse path in the monitoring packet, for a SRH of a reply to the monitoring packet.

9. The non-transitory computer-readable medium of claim 8, wherein the steps further include
    receiving the reply to the monitoring packet, with the reply having been on a same tunnel as the monitoring packet, for monitoring liveliness thereof.

10. The non-transitory computer-readable medium of claim 8, wherein the monitoring packet is one of Seamless-Bidirectional Forwarding Detection (S-BFD) and Bidirectional Forwarding Detection (BFD).

11. The non-transitory computer-readable medium of claim 10, wherein the SRH for the reply to the monitoring packet is in an extension header.

12. The non-transitory computer-readable medium of claim 8, wherein the monitoring packet is an Internet Control Message Protocol (ICMP) request.

13. The non-transitory computer-readable medium of claim 12, wherein the SRH for the reply to the monitoring packet is a Type-Length-Value (TLV) included therein.

14. The non-transitory computer-readable medium of claim 8, wherein the SRH for the forward path and the reverse path includes one of a classical SID and a micro SID.

15. A method implemented by a node configured to operate in a Segment Routing (SR) over Internet Protocol version 6 (SRv6) network, the method comprising steps of:
    determining a Segment Identifier (SID) list for a forward path in the SRv6 network and SID list for a reverse path in the SRv6 network; and
    transmitting a monitoring packet on the forward path including a Segment Routing Header (SRH) with the SID list for the forward path, and further including the SID list for the reverse path in the monitoring packet, for a SRH of a reply to the monitoring packet.

16. The method of claim 15, wherein the steps further include receiving the reply to the monitoring packet, with the reply having been on a same tunnel as the monitoring packet, for monitoring liveliness thereof.

17. The method of claim 15, wherein the monitoring packet is one of Seamless-Bidirectional Forwarding Detection (S-BFD) and Bidirectional Forwarding Detection (BFD).

18. The method of claim 17, wherein the SRH for the reply to the monitoring packet is in an extension header.

19. The method of claim 15, wherein the monitoring packet is an Internet Control Message Protocol (ICMP) request.

20. The method of claim 19, wherein the SRH for the reply to the monitoring packet is a Type-Length-Value (TLV) included therein.

* * * * *